United States Patent
Oh et al.

(10) Patent No.: US 10,808,656 B2
(45) Date of Patent: Oct. 20, 2020

(54) INTAKE AND EXHAUST SYSTEM FOR PREVENTING THE GENERATION OF CONDENSED WATER AND OPERATING METHODS THEREOF

(71) Applicants: HYUNDAI MOTOR COMPANY, Seoul (KR); KIA MOTORS CORPORATION, Seoul (KR)

(72) Inventors: Young-Kyu Oh, Gwacheon-si (KR); Tae-Ho Ahn, Incheon (KR); Keum-Jin Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/672,998

(22) Filed: Nov. 4, 2019

(65) Prior Publication Data

US 2020/0182206 A1   Jun. 11, 2020

(30) Foreign Application Priority Data

Dec. 10, 2018   (KR) .......... 10-2018-0158354

(51) Int. Cl.
*F02M 35/10*   (2006.01)
*F02D 41/00*   (2006.01)
(Continued)

(52) U.S. Cl.
CPC ....... *F02M 35/10222* (2013.01); *F02B 29/04* (2013.01); *F02B 37/00* (2013.01); *F02D 9/02* (2013.01); *F02D 41/005* (2013.01); *F02D 41/0032* (2013.01); *F02D 41/0035* (2013.01); *F02D 41/0052* (2013.01); *F02D 41/0055* (2013.01); *F02D 41/0065* (2013.01); (Continued)

(58) Field of Classification Search
None
See application file for complete search history.

(56) References Cited

U.S. PATENT DOCUMENTS 6,681,171 B2 *   1/2004   Rimnac ............... F02B 29/0418
                                                    123/568.22
6,725,847 B2 *   4/2004   Brunemann .......... F02D 41/005
                                                    123/568.12
(Continued)

FOREIGN PATENT DOCUMENTS

KR   10-2015-0071438 A   6/2015

*Primary Examiner* — Kevin R Steckbauer
(74) *Attorney, Agent, or Firm* — Brinks Gilson & Lione (57) ABSTRACT

An intake and exhaust system for preventing generation of condensed water may include: an exhaust gas recirculation (EGR) system circulating some of combustion gas from an exhaust pipe to an intake pipe; an active purging system compressing and supplying evaporation gas generated from a fuel tank to the intake pipe; and a controller to control the EGR system and the active purging system. In particular, the controller calculates a saturated water vapor pressure based on temperature at a position between the EGR system and the intake pipe, and calculates a saturated water vapor pressure based on temperature of the intake pipe and then compares one of the two saturated water vapor pressures with a water vapor pressure of intake air so as to reduce an EGR rate of the EGR system or a purging rate of the active purging system based on the comparison result.

13 Claims, 4 Drawing Sheets

(51) Int. Cl.
*F02B 29/04* (2006.01)
*F02D 9/02* (2006.01)
*F02D 41/30* (2006.01)
*F02B 37/00* (2006.01)
*F02M 26/33* (2016.01)
*F02M 26/47* (2016.01)
*F02M 35/08* (2006.01)

(52) U.S. Cl.
CPC ......... *F02D 41/3005* (2013.01); *F02M 26/33* (2016.02); *F02M 26/47* (2016.02); *F02D 41/0007* (2013.01); *F02D 2009/0235* (2013.01); *F02D 2041/007* (2013.01); *F02D 2041/0067* (2013.01); *F02D 2200/04* (2013.01); *F02D 2200/0414* (2013.01); *F02D 2200/0418* (2013.01); *F02M 35/088* (2013.01); *F02M 35/1038* (2013.01)

(56) References Cited

U.S. PATENT DOCUMENTS

| | | | | |
|---|---|---|---|---|
| 6,934,621 | B2* | 8/2005 | Bhargava | F02D 41/0007 123/568.12 |
| 7,079,938 | B2* | 7/2006 | Bhargava | F02D 41/0007 123/568.21 |
| 7,292,929 | B2* | 11/2007 | Durand | F02D 41/005 123/568.21 |
| 8,910,476 | B2* | 12/2014 | Nam | F02M 25/0227 60/605.2 |
| 8,961,368 | B2* | 2/2015 | Glugla | B60W 10/30 477/110 |
| 9,004,046 | B2* | 4/2015 | Glugla | F02M 25/0227 123/542 |
| 9,017,217 | B2* | 4/2015 | Norman | F16H 61/0213 477/98 |
| 9,032,939 | B2* | 5/2015 | Glugla | F02D 41/0002 123/540 |
| 9,051,901 | B2* | 6/2015 | Rumpsa | F02D 21/08 |
| 9,080,499 | B2* | 7/2015 | Glugla | F02M 35/088 |
| 9,115,658 | B2* | 8/2015 | Glugla | F02M 26/05 |
| 9,127,607 | B2* | 9/2015 | Glugla | F02D 41/0085 |
| 9,133,757 | B2* | 9/2015 | Glugla | F02D 41/123 |
| 9,140,178 | B2* | 9/2015 | Pursifull | F02B 29/0468 |
| 9,145,823 | B2* | 9/2015 | Glugla | F02D 41/0002 |
| 9,151,214 | B2* | 10/2015 | Glugla | F02B 29/0468 |
| 9,163,721 | B2* | 10/2015 | Norman | F16H 61/0213 |
| 9,169,809 | B2* | 10/2015 | Buckland | F02D 23/00 |
| 9,188,056 | B2* | 11/2015 | Glugla | F02B 29/0406 |
| 9,228,486 | B2* | 1/2016 | Pursifull | F02B 29/0431 |
| 9,267,423 | B2* | 2/2016 | Russ | F02M 31/20 |
| 9,284,880 | B2* | 3/2016 | Glugla | B60W 10/06 |
| 9,334,791 | B2* | 5/2016 | Glugla | F28F 27/02 |
| 9,359,941 | B2* | 6/2016 | Norman | F02B 37/16 |
| 9,359,964 | B2* | 6/2016 | Glugla | F02B 29/04 |
| 9,435,251 | B2* | 9/2016 | Surnilla | F02D 41/0007 |
| 9,488,152 | B2* | 11/2016 | Glugla | F02D 41/3029 |
| 9,650,946 | B2* | 5/2017 | Rollinger | F02B 29/0468 |
| 9,683,497 | B2* | 6/2017 | Surnilla | F02D 41/1454 |
| 9,732,690 | B2* | 8/2017 | Rollinger | F02B 29/0468 |
| 9,752,495 | B2* | 9/2017 | Glugla | F02D 41/3029 |
| 9,879,626 | B1* | 1/2018 | Mavalankar | F02D 41/0077 |
| 9,976,503 | B2* | 5/2018 | Surnilla | F02D 41/0007 |
| 9,989,023 | B2* | 6/2018 | Russ | F02B 37/162 |
| 10,006,338 | B2* | 6/2018 | Buckland | F02D 23/00 |
| 10,132,275 | B2* | 11/2018 | Kikuchi | F02M 26/32 |
| 10,156,212 | B2* | 12/2018 | Yokono | F02D 41/0072 |
| 10,202,888 | B2* | 2/2019 | Wicks | B60H 1/14 |
| 10,253,732 | B2* | 4/2019 | Tofukuji | F02M 26/18 |
| 10,280,853 | B2* | 5/2019 | Yoeda | F02M 26/06 |
| 10,316,788 | B2* | 6/2019 | Leone | F02D 23/00 |
| 10,563,623 | B2* | 2/2020 | Shinagawa | F02M 26/37 |
| 10,605,184 | B2* | 3/2020 | Surnilla | F02P 5/1516 |
| 10,634,040 | B2* | 4/2020 | Wicks | B60K 11/02 |
| 2003/0114978 | A1* | 6/2003 | Rimnac | F02B 29/0418 701/108 |
| 2003/0192516 | A1* | 10/2003 | Brunemann | F02M 26/05 123/568.12 |
| 2005/0021217 | A1* | 1/2005 | Bhargava | F02D 41/0007 701/108 |
| 2005/0021218 | A1* | 1/2005 | Bhargava | F02M 26/47 701/108 |
| 2007/0239344 | A1* | 10/2007 | Durand | G01N 25/66 701/108 |
| 2012/0279200 | A1* | 11/2012 | Nam | F02M 26/28 60/273 |
| 2012/0316753 | A1* | 12/2012 | Rumpsa | F02D 21/08 701/103 |
| 2014/0047833 | A1* | 2/2014 | Buckland | F02D 23/00 60/599 |
| 2014/0048048 | A1* | 2/2014 | Glugla | F02D 23/00 123/542 |
| 2014/0048049 | A1* | 2/2014 | Glugla | F02B 29/0418 123/563 |
| 2014/0075976 | A1* | 3/2014 | Glugla | F02B 29/0468 62/150 |
| 2014/0100074 | A1* | 4/2014 | Glugla | B60W 10/184 477/3 |
| 2014/0100758 | A1* | 4/2014 | Glugla | F02D 41/123 701/103 |
| 2014/0102424 | A1* | 4/2014 | Norman | F02B 37/16 123/542 |
| 2014/0109568 | A1* | 4/2014 | Glugla | F02D 41/10 60/599 |
| 2014/0109870 | A1* | 4/2014 | Glugla | F02D 41/144 123/406.11 |
| 2014/0109871 | A1* | 4/2014 | Glugla | F02B 29/0468 123/406.19 |
| 2014/0123963 | A1* | 5/2014 | Glugla | F02M 25/0227 123/542 |
| 2014/0128221 | A1* | 5/2014 | Glugla | B60W 10/06 477/97 |
| 2014/0128222 | A1* | 5/2014 | Norman | B60W 10/06 477/98 |
| 2014/0150755 | A1* | 6/2014 | Cunningham | F02M 35/1038 123/563 |
| 2014/0157772 | A1* | 6/2014 | Glugla | F02D 41/0007 60/599 |
| 2014/0158089 | A1* | 6/2014 | Glugla | F02M 26/05 123/403 |
| 2014/0222318 | A1* | 8/2014 | Ramappan | F02D 43/04 701/108 |
| 2014/0244136 | A1* | 8/2014 | Leone | F02D 13/0261 701/104 |
| 2014/0290630 | A1* | 10/2014 | Pursifull | F02M 26/04 123/564 |
| 2014/0352661 | A1* | 12/2014 | Glugla | F02D 41/04 123/406.19 |
| 2014/0352663 | A1* | 12/2014 | Glugla | F02B 29/0468 123/443 |
| 2015/0047339 | A1* | 2/2015 | Rollinger | F02D 41/1441 60/599 |
| 2015/0047603 | A1* | 2/2015 | Surnilla | F02D 41/0007 123/350 |
| 2015/0114346 | A1* | 4/2015 | Surnilla | F02D 11/105 123/349 |
| 2015/0135705 | A1* | 5/2015 | Pursifull | F02D 9/02 60/599 |
| 2015/0167540 | A1* | 6/2015 | Glugla | B60W 30/188 477/3 |
| 2015/0226320 | A1* | 8/2015 | Norman | F02B 29/0468 477/32 |
| 2015/0345371 | A1* | 12/2015 | Russ | F02M 31/205 123/542 |
| 2016/0047297 | A1* | 2/2016 | Buckland | F02M 26/05 701/103 |
| 2016/0169170 | A1* | 6/2016 | Russ | F02B 29/0468 60/599 |
| 2016/0369728 | A1* | 12/2016 | Surnilla | F02M 35/10393 |
| 2017/0051658 | A1* | 2/2017 | Glugla | F02D 41/0295 |

(56) References Cited

U.S. PATENT DOCUMENTS

| | | | |
|---|---|---|---|
| 2017/0067419 A1* | 3/2017 | Tofukuji | F02M 26/74 |
| 2017/0089279 A1* | 3/2017 | Yoeda | F02D 41/064 |
| 2017/0145903 A1* | 5/2017 | Sadakane | F02M 26/33 |
| 2017/0159547 A1* | 6/2017 | Wicks | B60K 11/02 |
| 2017/0191435 A1* | 7/2017 | Rollinger | F02D 41/1454 |
| 2017/0248089 A1* | 8/2017 | Surnilla | F02P 5/1516 |
| 2017/0306894 A1* | 10/2017 | Kikuchi | F02M 26/32 |
| 2018/0135569 A1* | 5/2018 | Han | F02M 26/46 |
| 2019/0120122 A1* | 4/2019 | Wicks | F02F 1/26 |
| 2019/0186430 A1* | 6/2019 | Shinagawa | F02M 26/32 |
| 2019/0368448 A1* | 12/2019 | Arakawa | F02D 43/00 |
| 2020/0025157 A1* | 1/2020 | Romanato | F02M 26/34 |

* cited by examiner

INTAKE AND EXHAUST SYSTEM FOR PREVENTING THE GENERATION OF CONDENSED WATER AND OPERATING METHODS THEREOF

CROSS-REFERENCE TO RELATED APPLICATION

This application claims priority to and the benefit of Korean Patent Application No. 10-2018-0158354, filed on Dec. 10, 2018, the entire contents of which are incorporated herein by reference.

FIELD

The present disclosure relates to an intake and exhaust system for preventing generation of condensed water and an operating method thereof.

BACKGROUND

The statements in this section merely provide background information related to the present disclosure and may not constitute prior art.

Vehicles are equipped with a charger to increase the power of an engine without changing the size of the engine. The charger compresses and injects air into a combustion chamber. Since air is compressed, the density of nitrogen and oxygen relatively increases in the combustion chamber. Accordingly, there is a high probability of production of nitrogen oxides during combustion. Therefore, vehicles with a charger are equipped an EGR system to reduce nitrogen oxides.

On the other hand, evaporation gas is produced in a fuel tank due to changes in internal pressure and temperature of the fuel tank. If evaporation gas accumulates in a fuel tank, the fuel tank may be damaged or the evaporation gas may leak to the atmosphere. When evaporation gas leaks to the atmosphere, it causes air pollution. In consideration of this problem, a method of adsorbing evaporation gas from a fuel tank using activated carbon stored in a canister has been used. The adsorbed evaporation gas is injected into an intake pipe and oxidized in a combustion chamber.

However, we have discovered that exhaust gas recirculation (EGR) gas that is circulated through an intake pipe by an EGR system contains moisture produced during combustion, and evaporation gas contains atmospheric moisture that may exist in a fuel tank. Accordingly, as EGR gas and evaporation gas flows into an intake pipe, there is high possibility that condensed water is produced in the intake pipe.

SUMMARY

The present disclosure provides an intake and exhaust system for inhibiting or preventing generation of condensed water, the system being able to prevent moisture contained in EGR gas and purging gas from condensing in an intake pipe, and a method of operating the system.

In one form of the present disclosure, an intake and exhaust system for preventing generation of condensed water may include: an intake pipe supplying external air to an engine; an exhaust pipe for discharging combustion gas from the engine; an exhaust gas recirculation (EGR) system circulating some of combustion gas from the exhaust pipe to the intake pipe; an active purging system compressing and supplying evaporation gas generated from a fuel tank to the intake pipe; and a control unit controlling the EGR system and the active purging system. In particular, the control unit is configured to: calculate a saturated water vapor pressure according to temperature at a position between the EGR system and the intake pipe, calculate a saturated water vapor pressure according to the temperature of the intake pipe, take a small value among the two calculated saturated water vapor pressures, compare the taken saturated water vapor pressure with a water vapor pressure of intake air flowing through the intake pipe, and reduce an EGR rate of the EGR system or a purging rate of the active purging system when the water vapor pressure of the intake air is equal to or greater than the taken saturated water vapor pressure.

A saturated water vapor pressure according to temperature around a position connected with the EGR system of the intake pipe may be calculated.

A turbocharger that is rotated by the pressure of exhaust gas may be disposed on exhaust pipe, and a compressor that is rotated by rotation of the turbocharger to compress and supply intake air to the engine and an intercooler that cools the intake air compressed by the compressor may be mounted on the intake pipe.

The control unit may calculate a condensation amount by comparing the water vapor pressure and absolute humidity of intake air measured or calculated at a position close to the front end of the compressor and the water vapor pressure and absolute humidity of intake air measured or calculated at a position close to the rear end of the intercooler.

The water vapor pressure and absolute humidity of the intake air at a position close to the rear end of the intercooler may be measured or calculated on the basis of a sensing signal from a throttle valve map sensor.

The control unit may calculate and accumulates the condensation amount every unit time, and may stop the EGR system or the active purging system when the total of accumulated condensation amount is equal to or greater than a critical value.

When the total of accumulated condensation amount is equal to or greater than the critical value, the control unit may perform a condensed water purge logic so that condensed water produced between the intercooler and the engine can be evaporated in a combustion chamber.

The condensed water purge logic may include gear ratio control, fuel injection amount control, throttle valve opening-degree control, and revolutions per minute (RPM) control of the engine.

In another form of the present disclosure, a method of operating an intake and exhaust system for preventing generation of condensed water includes: calculating a saturated water vapor pressure between an EGR system and an intake pipe; calculating a saturated water vapor pressure of the intake pipe and taking a small value among the two calculated saturated water vapor pressures; calculating water vapor pressure of intake air flowing through the intake pipe and comparing the water vapor pressure with the taken saturated water vapor pressure; and reducing an EGR rate of the EGR system connected with the intake pipe or a purging rate of the active purging system when the water vapor pressure of the intake air is equal to or greater than the taken saturated water vapor pressure.

The method may further include: measuring or calculating water vapor pressure or absolute humidity of intake air flowing at the front end of the compressor mounted on the intake pipe and measuring or calculating water vapor pressure and absolute humidity of intake air flowing at the rear end of the intercooler mounted on the intake pipe; and calculating a condensation amount by comparing the water vapor pressure and the absolute humidity at the front end of the compressor and the water vapor pressure and the absolute humidity at the rear end of the intercooler.

The measuring or calculating water vapor pressure and absolute humidity and the calculating condensation amount may be repeated, the condensation amount may be calculated and accumulated every unit time, and when the total of the accumulated condensation amount is equal to or greater than a critical value, the EGR system or the active purging system may be stopped.

When the total of accumulated condensation amount is equal to or greater than the critical value, a condensed water purge logic may be performed so that condensed water produced between the intercooler and the engine can be evaporated in a combustion chamber.

The total of the accumulated condensation amount (Qt) is used to calculate the condensed amount (RW) which is actually generated at the rear end of the intercooler by the following Equation.

$$RW[cc]=0.413+0.3500 \times Qt[g] \quad \text{[Equation]}$$

According to the intake and exhaust system for preventing generation of condensed water according to an exemplary form of the present disclosure as described above and the method of operating the system, since the water vapor pressure of intake air that is a mixture of EGR gas, evaporation gas, and new air and flows through the intake pipe is maintained lower than the saturated water vapor pressure, water is prevented from being produced in the intake pipe.

Further, according to the forms of the present disclosure as described above, condensed water that may be generated at the rear end of the intercooler is estimated by comparing the water vapor pressure and the absolute humidity at the front end of the compressor and the rear end of the intercooler. Further, when the total amount of condensed water accumulated for the unit time is a critical value or more, the EGR system and the active purging system are stopped. Accordingly, vapor is prevented from additionally flowing into the intake pipe. Condensed water is prevented from being generated between the rear end of the intercooler and the combustion chamber.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an intake and exhaust system for preventing generation of condensed water according to an exemplary form of the present disclosure and a method of operating the system are described with reference to the accompanying drawings.

Figure 1:
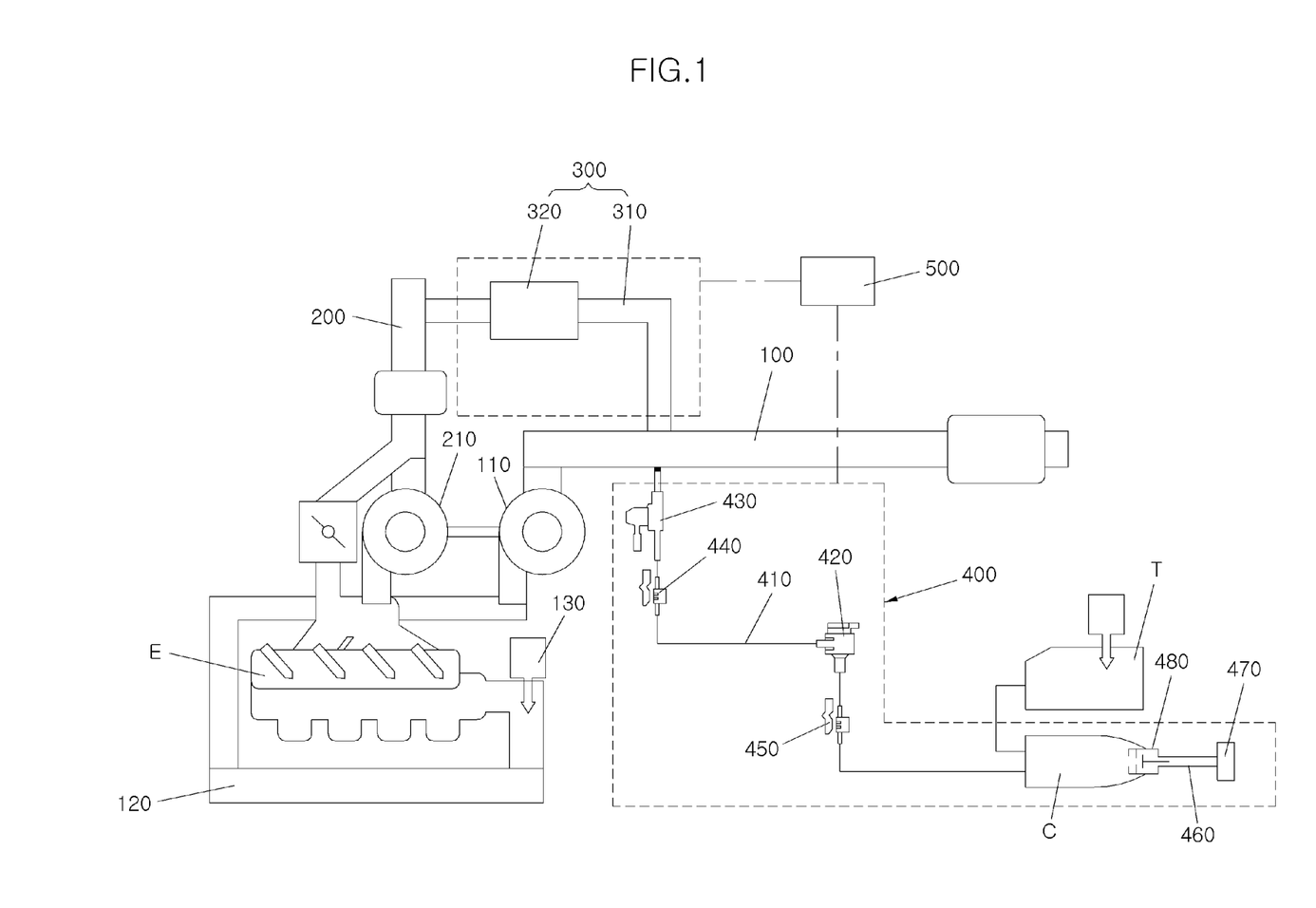
FIG. 1 is an exemplary view of an intake and exhaust system for preventing generation of condensed water according to one form of the present disclosure.

FIG. 1 is an exemplary view of an intake and exhaust system for preventing generation of condensed water according to one form of the present disclosure. As shown in FIG. 1, an intake and exhaust system for preventing generation of condensed water includes: an intake pipe 100 supplying external air to an engine E, an exhaust pipe 200 for discharging combustion gas from the engine E, an EGR system 300 circulating some of combustion gas from the exhaust pipe 200 to the intake pipe 100, an active purging system 400 compressing and supplying evaporation gas generated from a fuel tank T to the intake pipe 100, and a control unit 500 controlling the EGR system 300 and the active purging system 400.

The control unit 500 calculates a saturated water vapor pressure according to temperature at a position between the EGR system 300 and the intake pipe 100 and a saturated water vapor pressure according to the temperature of the intake pipe 100 and then takes a small value of the two saturated water vapor pressures. The control unit 500 compares the taken saturated water vapor pressure with the water vapor pressure of intake air flowing through the intake pipe 100. When the water vapor pressure of the intake air is the same as or larger than the taken saturated water vapor pressure, the control unit 500 reduces the EGR rate of the EGR system 300 or the purging rate of the active purging system 400.

The saturated water vapor pressures are obtained from a table determined in advance on the basis of temperatures actually measured at predetermined positions through a temperature sensor mounted on a pipe connecting the EGR system 300 and the intake pipe 100 and a temperature sensor mounted on the intake pipe 100. The temperature sensors are disposed at rear end of a position connected with the EGR system 300 of the intake pipe 100.

The water vapor pressure of the intake air flowing through the intake pipe 100 is calculated from the following Equation 1. In the following Equation 1, $P_{H2O, Mix}$ is water vapor pressure of intake air, EGR is an EGR gas ratio of intake air that is an EGR rate, PUR is an evaporation gas ratio of intake air that is a purging rate, $P_{H2O,amb,Sat}$ is saturated water vapor pressure of new air, RH is relative humidity of intake air, $P_{H2O,EGR}$ is water vapor pressure of EGR gas, and $P_{H2O,PUR}$ is water vapor pressure of evaporation gas.

$$P_{H2O,Mix}(1-EGR-PUR) \times RH \times P_{H2O,amb,Sat}+(EGR \times P_{H2O,EGR})+(PUR \times P_{H2O,PUR}) \quad \text{[Equation 1]}$$

The saturated water vapor pressure of new air is obtained from a sensing signal of a sensor mounted at a position close to the front end of the intake pipe 100. The water vapor pressure of EGR gas is obtained from a sensing signal of a sensor mounted at the EGR system 300. The water vapor pressure of evaporation gas is obtained from a sensing signal of a sensor mounted at the active purging system 400.

A turbocharger 210 that is rotated by the pressure of exhaust gas is disposed on exhaust pipe 200. A compressor 110 that is rotated by rotation of the turbocharger 210 to compress and supply intake air to the engine E and an intercooler 120 that cools the intake air compressed by the compressor 110 are mounted on the intake pipe 100.

The control unit 500 calculates a condensation amount at a position close to the rear end of the intercooler 120 by comparing the water vapor pressure and absolute humidity of intake air measured or calculated at a position close to the front end of the compressor 110 and the water vapor pressure and absolute humidity of intake air measured or calculated at a position close to the rear end of the intercooler 120.

The condensation amount is calculated from the following Equation 2. In the following Equation 2, Qc is a condensation amount, hu2 is absolute humidity at a position close to the front end of the compressor 110, m2 is the flow rate of intake air at a position close to the front end of the compressor 110, p2 is the concentration of intake air at a position close to the front end of the compressor 110, hu3 is absolute humidity at a position close to the rear end of the intercooler 120, m3 is the flow rate of intake air at a position close to the rear end of the intercooler 120, and p3 is concentration of intake air at a position close to the rear end of the intercooler 120.

$$Qc = hu2 \times \frac{m2}{p2} - hu3 \times \frac{m3}{p3} \qquad \text{[Equation 2]}$$

The flow rate of intake air at a position close to the front end of the compressor 110 is measured or calculated on the basis of the number of revolutions of the compressor 110 and the flow rate of intake air at a position close to the rear end of the intercooler 120 is measured or calculated on the basis of a sensing signal from a throttle valve map sensor 130.

The absolute humidity at a position close to the front end of the compressor 110 and the rear end of the intercooler 120 is calculated from the following Equation 3. In the following Equation 3, A is absolute humidity, C is a constant 2.16679 [gK/J], Pw is water vapor pressure on intake air flowing through predetermined positions, and T is absolute temperature at predetermined positions.

$$A = C \times Pw \times \frac{100}{T} [g/m^3] \qquad \text{[Equation 3]}$$

The control unit 500 calculates and accumulates a condensation amount every unit time through Equations 2 and 3 above. When the total of accumulated condensation amount is a critical value or more, the control unit 500 stops the EGR system 300 or the active purging system 400. The critical value is a predetermined value and is selected from values provided in advance through a table in consideration of the atmospheric pressure, temperature, humidity, etc. of the environment in which a vehicle travels.

When the total of accumulated condensation amount is the critical value or more, the control unit 500 performs a condensed water purge logic so that condensed water produced between the intercooler 120 and the engine E can be evaporated in a combustion chamber. The condensed water purge logic includes gear ratio control, fuel injection amount control, throttle valve opening-degree control, and RPM control of the engine E. As the condensed water purge logic is performed, water that may exist at the rear end of the intercooler 120 is forcibly injected and evaporated in the combustion chamber.

The active purging system includes: a purge line 410 connecting a fuel tank T, a canister C, and the intake pipe 100; a purge pump 420 mounted on the purge line 410; a purge valve 430 mounted on the purge line 410 between the purge pump 420 and the intake pipe 100; a first pressure sensor 440 mounted on the purge line 410 between the purge pump 420 and the purge valve 430; a second pressure sensor 450 mounted on the purge line 410 between the canister C and the purge pump 420; a vent line 460 extending from the canister C to the atmosphere; a filter 470 mounted at an end of the vent line 460; and a vent valve 480 mounted on the vent line 460 between the canister C and the filter 470. A sensor is disposed between the purge valve 430 and the intake pipe 100. The sensor monitors the temperature, flow rate, etc. of evaporation gas.

The control unit 500 controls the number of revolutions of the purge pump 420 and the amount of opening of the purge valve 430, thereby being able to control the density and flow rate of evaporation gas that is supplied to the intake pipe 100. Consequently, it is possible to estimate the density and flow rate of the evaporation gas flowing in the combustion chamber.

The EGR system 300 includes: an EGR pipe 310 extending from the rear end of the exhaust pipe 200 to the intake pipe 100; and an EGR cooler 320 mounted on the EGR pipe 310. A valve that allows for and blocks flow of EGR gas may be disposed at the front end or the rear end of the EGR cooler 320. Sensors are mounted at the front end and the rear end of the EGR cooler 320, respectively. The sensors monitor the temperature, flow rate, etc. of EGR gas.

Figure 2A:
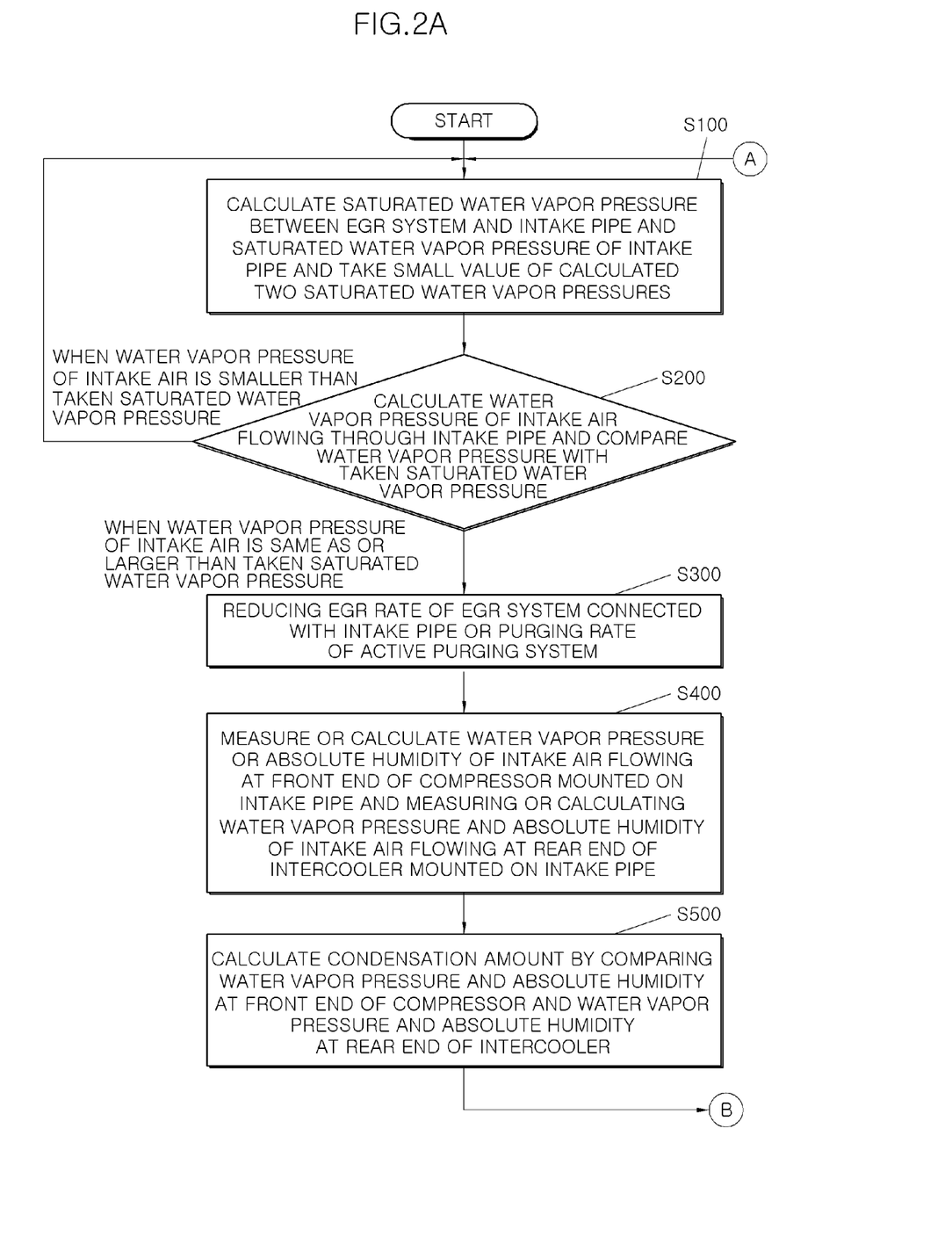
FIGS. 2A and 2B are flowcharts showing a method of operating an intake and exhaust system for preventing generation of condensed water according to one form of the present disclosure.
Figure 2B:
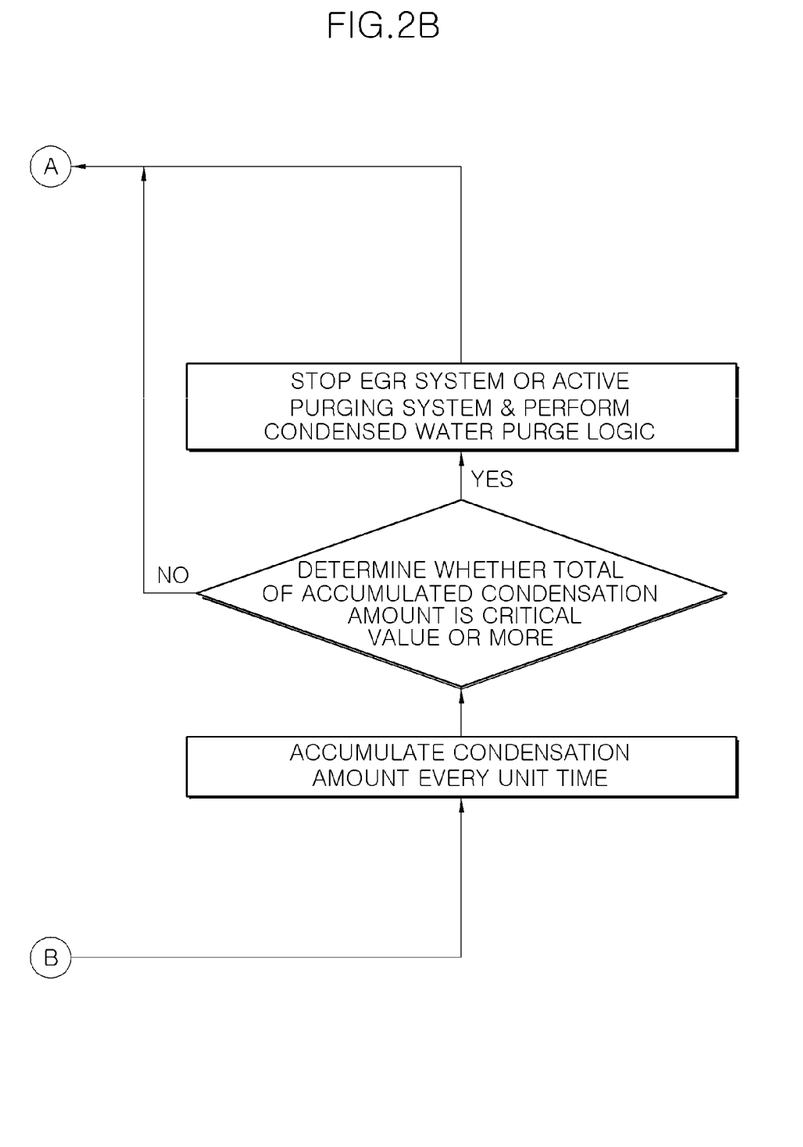

The intake and exhaust system for preventing generation of condensed water according to one form of the present disclosure having the configuration described above is operated in accordance with the flowchart shown in FIGS. 2A and 2B.

FIGS. 2A and 2B are flowcharts showing a method of operating an intake and exhaust system for preventing generation of condensed water according to one form of the present disclosure. As shown in FIGS. 2A and 2B, a method of operating the intake and exhaust system for preventing generation of condensed water includes: calculating a saturated water vapor pressure between the EGR system 300 and the intake pipe 100 and a saturated water vapor pressure of the intake pipe 100 and taking a small value of the calculated two saturated water vapor pressures (S100); calculating water vapor pressure of intake air flowing through the intake pipe 100 and comparing the water vapor pressure with the taken saturated water vapor pressure (S200); reducing an EGR rate of the EGR system 300 connected with the intake pipe 100 or a purging rate of the active purging system 400 (S300) when the water vapor pressure of the intake air is the same as or larger than the taken saturated water vapor pressure; measuring or calculating water vapor pressure or absolute humidity of intake air flowing at the front end of the compressor 110 mounted on the intake pipe 100 and measuring or calculating water vapor pressure and absolute humidity of intake air flowing at the rear end of the intercooler 120 mounted on the intake pipe 100 (S400); and calculating a condensation amount by comparing the water vapor pressure and the absolute humidity at the front end of the compressor 110 and the water vapor pressure and the absolute humidity at the rear end of the intercooler 120 (S500).

An exemplary form of the present disclosure repeats all steps from the taking of a small value of the two calculated saturated water vapor pressures (S100) to the calculating of a condensation amount (S500). The condensation amount is calculated and accumulated every unit time during the repetition. When the total of accumulated condensation amount is a critical value or more, the EGR system 300 or the active purging system 400 is stopped. When the total of accumulated condensation amount is the critical value or more, the a condensed water purge logic is performed so that condensed water produced between the intercooler 120 and the engine E can be evaporated in a combustion chamber.

According to the intake and exhaust system for preventing generation of condensed water according to the form of the present disclosure as described above and the method of operating the system, since the water vapor pressure of intake air that is a mixture of EGR gas, evaporation gas, and new air and flows through the intake pipe 100 is maintained lower than the saturated water vapor pressure, water is prevented from being generated in the intake pipe 100.

Further, according to the form of the present disclosure as described above, condensed water that may be generated at the rear end of the intercooler 120 is estimated by comparing the water vapor pressure and the absolute humidity at the front end of the compressor 110 and the rear end of the intercooler 120. Further, when the total amount of condensed water accumulated for the unit time is a critical value or more, the EGR system 300 and the active purging system 400 are stopped. Accordingly, vapor is inhibited or prevented from additionally flowing into the intake pipe 100. Condensed water is prevented from being generated between the rear end of the intercooler 120 and the combustion chamber.

As described above, condensed water that may be generated at the rear end of the intercooler 120 is estimated by comparing the water vapor pressure and the absolute humidity at the front end of the compressor 110 and the rear end of the intercooler 120. In order to make this relationship more clear, the total amount of condensed water estimated by the method of operating the intake and exhaust system for inhibiting or preventing generation of condensed water according to one form of the present disclosure during actual driving and the total amount of condensed water generated at the rear end of the intercooler 120 were compared after driving.

Figure 3:
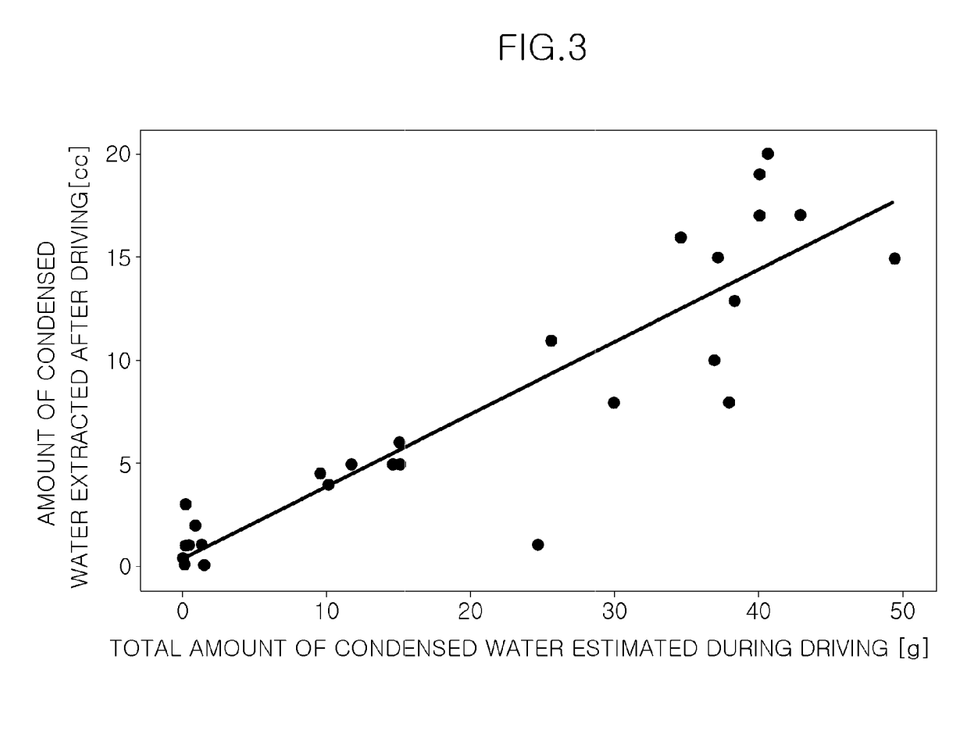
FIG. 3 is a chart showing the relationship between actually measured condensed water and the amount of condensed water calculated by an intake and exhaust system for preventing generation of condensed water according to one form of the present disclosure and a method of operating the system.

A vehicle for the tests was driven several times on actual roads (a normal road and a highway) at a low-temperature condition of −10 to 10 degree Celsius. In the tests, the total amount of condensed water was estimated during driving and all of condensed water actually generated at the rear end of the intercooler 120 was extracted after driving. The total amount of condensed water estimated in the tests and the amount of condensed water actually measured were shown by points in an xy coordination system in the chart of FIG. 3. In FIG. 3, the x axis is the total amount of condensed water estimated during driving and the y axis is the amount of condensed water extracted after driving.

The test result shown in FIG. 3 was numerically shown through a numerical method. The derived numerical formula is the following Equation 4. The derived numerical formula can be expressed as a linear graph shown in FIG. 3. In the following Equation 4, RW is the total amount of condensed water actually extracted and Qt is the total amount of estimated condensed water.

$$RW[cc]=0.413+0.3500 \times Qt[g]$$ [Equation 4]

As described above, the total amount of condensed water estimated and the amount of actually generated condensed water has a linear relationship, so it can be seen that there is a strong relationship. When introducing factors that reduce condensed water such as evaporation and movement by airflow into the Equations 1 to 3 described above, it is expected that the total amount of condensed water estimated through the intake and exhaust system for preventing generation of condensed water of in one form of the present disclosure and the method of operating the system and the total amount of condensed water actually extracted become closer to each other.

What is claimed is:

1. An intake and exhaust system for preventing generation of condensed water, the intake and exhaust system comprising:
    an intake pipe supplying external air to an engine; an exhaust pipe for discharging combustion gas from the engine;
    an exhaust gas recirculation (EGR) system circulating some of combustion gas from the exhaust pipe to the intake pipe;
    an active purging system compressing and supplying evaporation gas generated from a fuel tank to the intake pipe; and
    a control unit configured to control the EGR system and the active purging system, wherein the control unit is configured to:
        calculate a first saturated water vapor pressure based on temperature at a position between the EGR system and the intake pipe,
        calculate a second saturated water vapor pressure based on temperature of the intake pipe,
        select a smallest value among the calculated first and second saturated water vapor pressures, and compare the selected saturated water vapor pressure with a water vapor pressure of intake air flowing through the intake pipe, and
        reduce an EGR rate of the EGR system or a purging rate of the active purging system when the water vapor pressure of the intake air is equal to or greater than the selected saturated water vapor pressure.

2. The intake and exhaust system of claim 1, wherein the first saturated water vapor pressure is calculated based on temperature around a position connected with the EGR system of the intake pipe calculated.

3. The intake and exhaust system of claim 1, wherein a turbocharger that is rotated by pressure of exhaust gas is disposed on the exhaust pipe, and
    a compressor that is rotated by rotation of the turbocharger to compress and supply the intake air to the engine and an intercooler that cools the intake air compressed by the compressor are mounted on the intake pipe.

4. The intake and exhaust system of claim 3, wherein the control unit calculates a condensation amount by comparing a water vapor pressure and an absolute humidity of the intake air measured or calculated at a position close to a front end of the compressor with a water vapor pressure and an absolute humidity of the intake air measured or calculated at a position close to a rear end of the intercooler.

5. The intake and exhaust system of claim 4, wherein the water vapor pressure and the absolute humidity of the intake air at the position close to the rear end of the intercooler are measured or calculated based on a sensing signal from a throttle valve map sensor.

6. The intake and exhaust system of claim 4, wherein the control unit calculates and accumulates the condensation amount every unit time, and
the control unit stops the EGR system or the active purging system when a total of accumulated condensation amount is equal to or greater than a critical value.

7. The intake and exhaust system of claim 6, wherein when the total of accumulated condensation amount is equal to or greater than the critical value, the control unit performs a condensed water purge logic so that condensed water produced between the intercooler and the engine is evaporated in a combustion chamber.

8. The intake and exhaust system of claim 7, wherein the condensed water purge logic includes gear ratio control, fuel injection amount control, throttle valve opening-degree control, and revolutions per minute (RPM) control of the engine.

9. A method of operating an intake and exhaust system for preventing generation of condensed water, the method comprising:
calculating a first saturated water vapor pressure between an exhaust gas recirculation (EGR) system and an intake pipe;
calculating a second saturated water vapor pressure of the intake pipe and selecting a smallest value among the calculated first and second saturated water vapor pressures;
calculating a water vapor pressure of intake air flowing through the intake pipe and comparing the water vapor pressure with the selected saturated water vapor pressure; and
reducing an EGR rate of the EGR system connected with the intake pipe or a purging rate of an active purging system in response to the water vapor pressure of the intake air being equal to or greater than the selected saturated water vapor pressure.

10. The method of claim 9, further comprising:
measuring or calculating a water vapor pressure and an absolute humidity of intake air flowing at a front end of a compressor mounted on the intake pipe;
measuring or calculating a water vapor pressure and an absolute humidity of intake air flowing at a rear end of an intercooler mounted on the intake pipe; and
calculating a condensation amount by comparing the water vapor pressure and the absolute humidity at the front end of the compressor and the water vapor pressure and the absolute humidity at the rear end of the intercooler.

11. The method of claim 10, wherein the measuring or calculating water vapor pressure and absolute humidity at each of the front end of the compressor and the rear end of the intercooler and the calculating condensation amount are repeated, the condensation amount is calculated and accumulated every unit time, and when a total of the accumulated condensation amount is equal to or greater than a critical value, the EGR system or the active purging system is stopped.

12. The method of claim 11, wherein when the total of accumulated condensation amount is equal to or greater than the critical value, a condensed water purge logic is performed so that condensed water produced between the intercooler and the engine is evaporated in a combustion chamber.

13. The method of claim 11, wherein the total of the accumulated condensation amount (Qt) is used to calculate a condensed amount (RW) which is actually generated at the rear end of the intercooler by the following Equation $$RW[cc]=0.413+0.3500 \times Qt[g].$$

* * * * *